(12) United States Patent
Liu et al.

(10) Patent No.: US 11,597,810 B2
(45) Date of Patent: Mar. 7, 2023

(54) EQUIPMENT AND METHOD FOR CONTINUOUSLY PREPARING GRAPHENE POWDER DIRECTLY DISPERSED IN ORGANIC SYSTEM

(71) Applicants: NORTH UNIVERSITY OF CHINA, Taiyuan (CN); SHANXI ZHONGBEI NEW MATERIAL TECHNOLOGY CO., LTD., Taiyuan (CN)

(72) Inventors: Yaqing Liu, Taiyuan (CN); Guizhe Zhao, Taiyuan (CN); Mingshan Gong, Taiyuan (CN); Yang Xiang, Taiyuan (CN)

(73) Assignees: NORTH UNIVERSITY OF CHINA, Taiyuan (CN); SHANXI ZHONGBEI NEW MATERIAL TECHNOLOGY CO., LTD., Taiyuan (CN)

( * ) Notice: Subject to any disclaimer, the term of this patent is extended or adjusted under 35 U.S.C. 154(b) by 0 days.

(21) Appl. No.: 17/970,444

(22) Filed: Oct. 20, 2022

(65) Prior Publication Data
US 2023/0040074 A1 Feb. 9, 2023

(51) Int. Cl.
*C08K 3/04* (2006.01)
*C08F 120/14* (2006.01)
*C08J 3/12* (2006.01)
*C08J 3/205* (2006.01)

(52) U.S. Cl.
CPC ............ *C08K 3/042* (2017.05); *C08F 120/14* (2013.01); *C08J 3/122* (2013.01); *C08J 3/2053* (2013.01); *C08J 2333/12* (2013.01)

(58) Field of Classification Search
CPC ........ C08K 3/042; C08F 120/14; C08J 3/122; C08J 3/2053; C08J 2333/12
See application file for complete search history.

(56) References Cited

U.S. PATENT DOCUMENTS

| | | | |
|---|---|---|---|
| 2018/0179359 A1 | 6/2018 | Jang et al. | |
| 2019/0284350 A1 | 9/2019 | Al-Harthi et al. | |

FOREIGN PATENT DOCUMENTS

| | | | |
|---|---|---|---|
| CN | 102827315 A | 12/2012 | |
| CN | 104193864 A | 12/2014 | |
| CN | 106928448 A | 7/2017 | |
| CN | 107459725 A | 12/2017 | |
| CN | 109455710 A | 3/2019 | |
| CN | 109575642 A | 4/2019 | |
| KR | 101413837 B1 | 7/2014 | |

OTHER PUBLICATIONS

CN 106928448 machine translation (Year: 2017).*
Hu et al., Preparation and properties of graphene nanosheets-polystyrene nanocomposites via in situ emulsion polymerization, Chemical Physics Letters, 2010, 484(4-6), 247-253.
Chen et al., Tunable d-spacing of dry reduced graphene oxide nanosheets for enhancing re-dispersibility in organic solvents. Applied Surface Science, 2020, 531, 1-9.

* cited by examiner

*Primary Examiner* — Edward J Cain

(57) ABSTRACT

A method for continuously preparing graphene powder directly dispersed in an organic system, including: mixing an aqueous graphene oxide dispersion, an emulsifier and an oil-soluble monomer followed by pH adjustment and dispersing to obtain a pre-emulsified dispersion; subjecting the pre-emulsified dispersion to an emulsion polymerization reaction in the presence of an initiator; introducing a reducing agent to reduce graphene oxide; and subjecting the reaction mixture after emulsion polymerization to spray drying to obtain the graphene powder. Equipment used in the preparation method is also provided herein.

9 Claims, 4 Drawing Sheets

EQUIPMENT AND METHOD FOR CONTINUOUSLY PREPARING GRAPHENE POWDER DIRECTLY DISPERSED IN ORGANIC SYSTEM

CROSS-REFERENCE TO RELATED APPLICATIONS

This application claims the benefit of priority from Chinese Patent Application No. 202210447297.0, filed on Apr. 27, 2022. The content of the aforementioned application, including any intervening amendments thereto, is incorporated herein by reference in its entirety.

TECHNICAL FIELD

This application relates to graphene preparation, and more particularly to equipment and a method for continuously preparing graphene powder directly dispersed in an organic system.

BACKGROUND

Graphene is an emerging material featuring a single-layer two-dimensional honeycomb lattice structure made of densely ordered carbon atoms through $sp^2$ hybrid connection. Graphene is considered as one of the most promising materials in material engineering, micro-nano fabrication, energy, biomedicine, and drug delivery because of its excellent optical, electrical, and mechanical properties. However, graphene is prone to agglomeration due to the large specific surface area of its sheets and the intermolecular force between its layers, which limits its functional application.

At present, industrialized graphene is usually stored and used with water as the dispersion medium. However, in some cases, graphene needs to be dispersed in an organic system, such as organic solvent, resin, rubber, and organic coating, which requires modification to graphene. At present, graphene modification mainly includes covalent and non-covalent approaches. Regarding the covalent modification method, the oxygen-containing functional groups on the surface of graphene can be covalently bound with a modifier with good bonding strength. However, related modification technologies usually involve expensive experimental instruments, complex sample preparing processes and excessive consumption of reagents. The non-covalent modification relies on intermolecular interactions such as Van der Waals force and cation-π interaction to bond graphene with the modifier, but these interactions are weak and will be easily replaced by solvent molecules, which may result in the secondary agglomeration of non-covalently modified graphene particles, leading to poor dispersion effect and dispersion stability. Therefore, there is an urgent need to develop a simple and efficient system and process to prepare modified graphene with good dispersibility and dispersion stability to adapt to various organic systems.

SUMMARY

In view of the deficiencies in the prior art that it is difficult to prepare graphene powder that can be directly dispersed in an organic system in batch, this application provides equipment and a method for continuously preparing graphene powder directly dispersed in an organic system. Technical solutions of this application are described as follows.

This application provides a method for continuously preparing graphene powder directly dispersed in an organic system; an equipment used in the method includes a pre-emulsification kettle, an emulsion-polymerization kettle and a spray dryer connected sequentially in series through pipelines; the equipment further includes a feeding peristaltic pump arranged in series on a pipeline between the emulsion-polymerization kettle and the spray dryer; the pre-emulsification kettle is equipped with a first mechanical stirring device and an ultrasonic probe; a bottom of the pre-emulsification kettle is provided with a first control valve; the emulsion-polymerization kettle is equipped with a second mechanical stirring device and a heating device; a bottom of the emulsion-polymerization kettle is provided with a second control valve; and the method includes:

(S1) adding successively a graphene oxide aqueous dispersion, an emulsifier and an oil-soluble monomer into the pre-emulsification kettle, followed by adjusting pH to alkaline and dispersing at room temperature by using the first mechanical stirring device and the ultrasonic probe to obtain a pre-emulsified dispersion; wherein the oil-soluble monomer is an olefinic monomer;(S2) opening the first control valve, and feeding the pre-emulsified dispersion into the emulsion-polymerization kettle; turning on the second mechanical stirring device and the heating device to heat the pre-emulsified dispersion to a first preset temperature under stirring; and adding an initiator to carry out an emulsion polymerization reaction;

(S3) adjusting the emulsion-polymerization kettle to a second preset temperature; adding a reducing agent to reduce graphene oxide; and turning off the heating device; and (S4) opening the second control valve; and feeding a reaction mixture after emulsion polymerization in the emulsion-polymerization kettle into the spray dryer through the feeding peristaltic pump, followed by drying at a third preset temperature to obtain the graphene powder;

the pre-emulsification kettle is configured for pre-emulsification of raw materials;

the ultrasonic probe is configured to emulsify the oil-soluble monomer into micro-nano droplets and promote adsorption of the micro-nano droplets on a surface of a graphene oxide sheet; and an ultrasonic power of the ultrasonic probe is 200 W; the first mechanical stirring device is configured to assist the emulsification of the oil-soluble monomer to allow the micro-nano droplets of the oil-soluble monomer and graphene oxide sheets to be uniformly dispersed in the water phase; and a stirring speed of the first mechanical stirring device is 200~400 r/min;

the emulsion-polymerization kettle is configured for an emulsion polymerization reaction of the oil-soluble monomer;

the heating device is configured to provide a required temperature for the emulsion polymerization reaction;

the second mechanical stirring device is configured for uniform mixing of an emulsion polymerization reaction system; the feeding peristaltic pump is configured to pump the reaction mixture after an emulsion polymerization in the emulsion-polymerization kettle into the spray dryer at a constant speed; and the spray dryer is configured to dry the reaction mixture into the graphene powder rapidly.

The principle of the preparation method in this application is explained as follows.

Prepared by the method provided herein is a graphene powder formed by the reduced graphene oxide and oil-soluble polymer micro/nano particles tightly coated thereon, which could be directly dispersed in organic systems. Some of the oil-soluble polymer micro/nano particles are tightly bound to the hexagonal honeycomb lattice composed of $sp^2$ hybrid orbitals in the reduced graphene oxide through the π-π conjugation interaction, and some of the oil-soluble polymer micro/nano particles are covalently bound to the oxygen-containing functional groups in the reduced graphene oxide. By means of the synergistic effect between π-π conjugation and covalent binding, on one hand, the oil-soluble polymer micro/nano particles are tightly coated on the surface of the reduced graphene oxide, which can effectively prevent the agglomeration of the reduced graphene oxide during the spray drying process; on the other hand, the graphene powder can be easily dispersed and long-term stable dispersion after being transferred to an organic system. Even if the oil-soluble polymer micro-nano particles with non-covalent interaction are dissolved and separated from the surface of a reduced graphene oxide sheet, those oil-soluble polymer micro-nano particles with covalent-bound can also prevent the agglomeration of the reduced graphene oxide in organic systems.

In an embodiment, in step (S1), a mass ratio of the oil-soluble monomer to the emulsifier to graphene oxide is (10~100): (0.5~5): 1, and the dispersion is performed for 0.1~1 h.

In an embodiment, in step (S1), the oil-soluble monomer is an olefinic monomer selected from the group consisting of styrene, ethylene, vinyl acetate, vinyl chloride, butadiene, isoprene, methyl acrylate and methyl methacrylate.

In an embodiment, in step (S1), the emulsifier is selected from the group consisting of fatty acid salt, sulfate, sulfonate, quaternary ammonium salt, amino acid, dehydrated sorbitol fatty acid ester, polyoxyethylene dehydrated sorbitol fatty acid ester, alkylphenol polyether alcohol, polyvinyl alcohol, polyvinylpyrrolidone, polyoxyethylene fatty acid, and polyoxyethylene fatty acid ether.

In an embodiment, in step (S2), a mass ratio of the initiator to the oil-soluble monomer is (0.001~0.05): 1, and the emulsion polymerization reaction is performed at 70~100° C. for 4~10 h.

In an embodiment, in step (S2), the initiator is a water-soluble initiator or a redox composite initiation system; the water-soluble initiator is selected from the group consisting of potassium persulfate and ammonium persulfate; an oxidant in the redox composite initiation system is selected from the group consisting of hydrogen peroxide, persulfate and hydroperoxide, and a reducing agent in the redox composite initiation system is selected from the group consisting of sodium bisulfite, sodium sulfite, alcohol, amine and oxalic acid.

In an embodiment, in step (S3), a mass ratio of the reducing agent to the graphene oxide is (0.1~10): 1; and the reduction reaction is performed at 70~100° C. for 0.5~24 h.

In an embodiment, in step (S3), the reducing agent is selected from the group consisting of hydrazine and hydrazine derivative, amino acid, amine, monohydric alcohol, polyhydric alcohol, monohydric phenol, polyhydric phenol, inorganic sulfide, organic sulfide, strong alkali, metal hydride, alkali metal, amphoteric metal, and low-valent metal ion.

In an embodiment, in step (S4), an inlet air temperature of the spray dryer is 60~200° C., and an outlet air temperature is 20~100° C. .Compared to the prior art, this application has the following beneficial effects:

1. Due to the synergistic effect between π-π conjugation and covalent binding, the oil-soluble polymer micro/nano particles are tightly coated on the surface of the reduced graphene oxide, which can effectively avoid the secondary agglomeration of the graphene generally occurring in the traditional drying process and realize the uniform, prolonged and stable dispersion of the modified graphene powder in an organic system at a relatively high concentration.
2. The preparation method provided herein involves simple equipment, high efficiency and stability, and is suitable for industrial batch production.
3. The monomer can be selected according to the specific organic solvent or polymer matrix, allowing for high flexibility and compatibility.

BRIEF DESCRIPTION OF THE DRAWINGS

The accompanying drawings used in the embodiments of the present disclosure or the prior art will be briefly introduced below to illustrate the technical solutions in the embodiments of the present disclosure or the prior art more clearly. Obviously, presented in the accompanying drawings are merely some embodiments of the present disclosure, which are not intended to limit the disclosure. For those skilled in the art, other drawings can also be obtained based on these drawings without paying creative efforts.

DETAILED DESCRIPTION OF EMBODIMENTS

The disclosure will be further described in detail below with reference to the embodiments. Obviously, described below are merely some embodiments of the present disclosure, which are not intended to limit the disclosure. For those skilled in the art, other embodiments obtained based on these embodiments without paying creative efforts should fall within the scope of the disclosure defined by the present claims.

It should be noted that as used herein, the terms "first" and "second" are merely descriptive and cannot be understood as indicating or implying relative importance.

Figure 1:
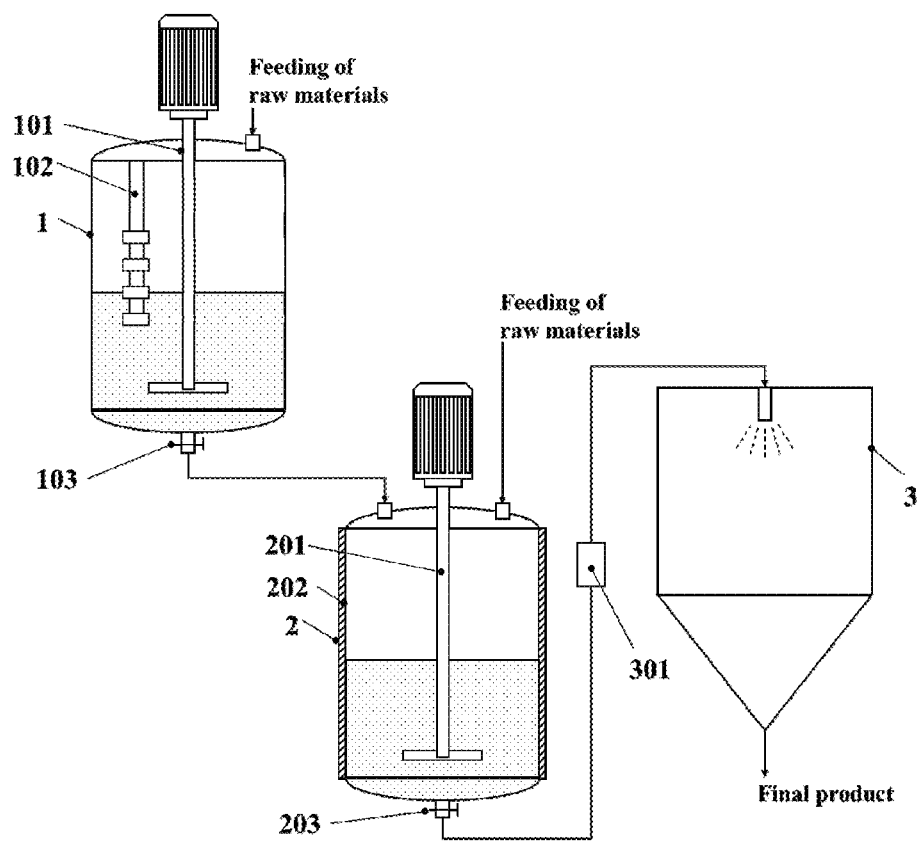
FIG. 1 is a structural diagram of the equipment for the industrial continuous preparation of graphene powder directly dispersed in an organic system according to an embodiment of the present disclosure. In the FIG. 1: 1-pre-emulsification kettle; 101-first mechanical stirring device; 102-ultrasonic probe; 103-first control valve; 2-emulsion-polymerization kettle; 201-second mechanical stirring device; 202-heating device; 203-second control valve; 3-spray dryer; and 301-feeding peristaltic pump.
Figure 2A:
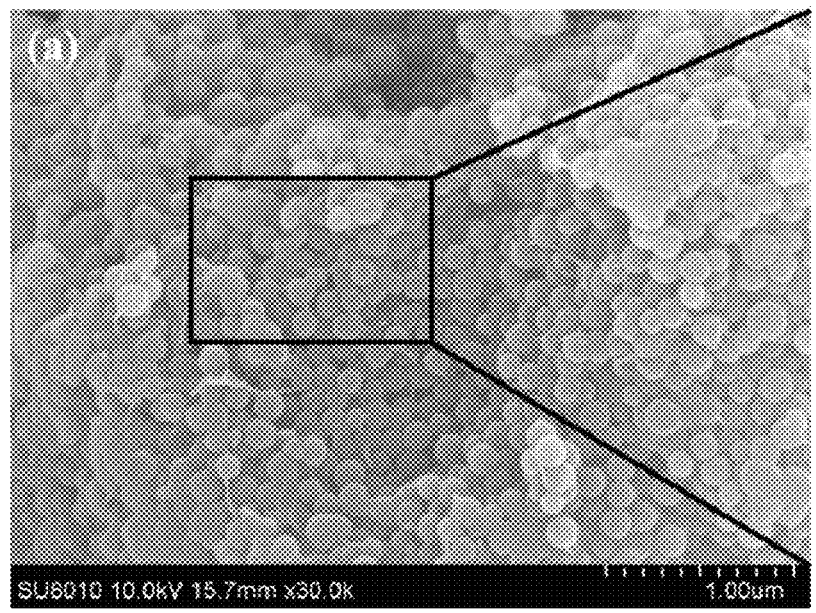
FIGS. 2a-2d are scanning electron microscopy images of graphene powder prepared according to an embodiment of the present disclosure, where 2b is a partially enlarged view of 2a, and 2d is a partially enlarged view of 2c.
Figure 2B:
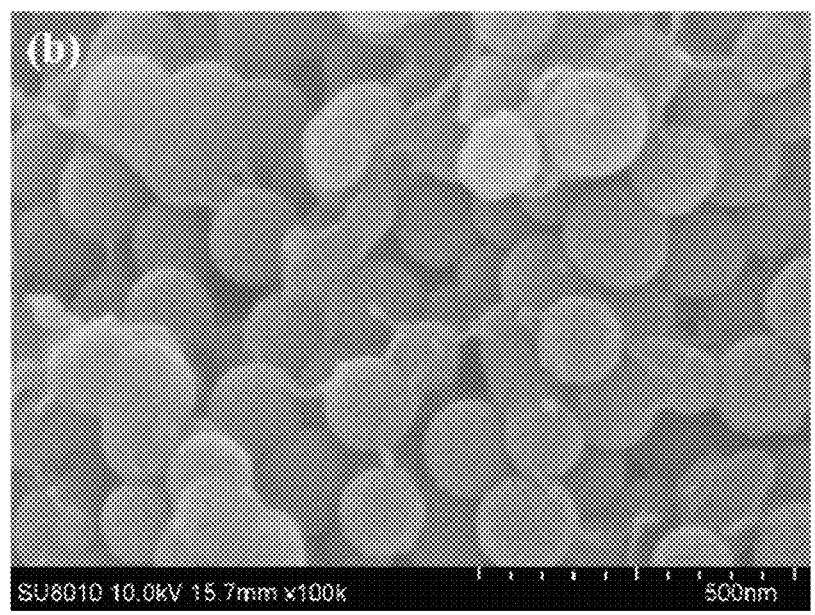
Figure 2C:
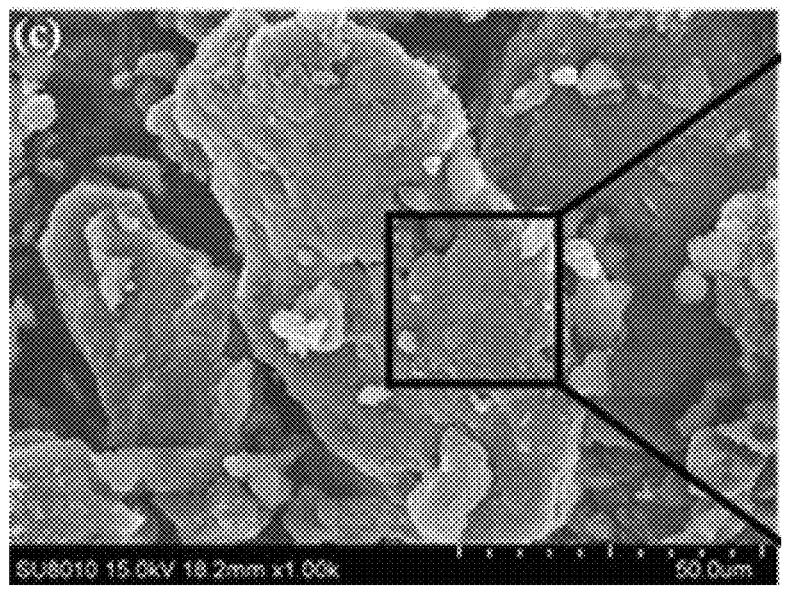
Figure 2D:
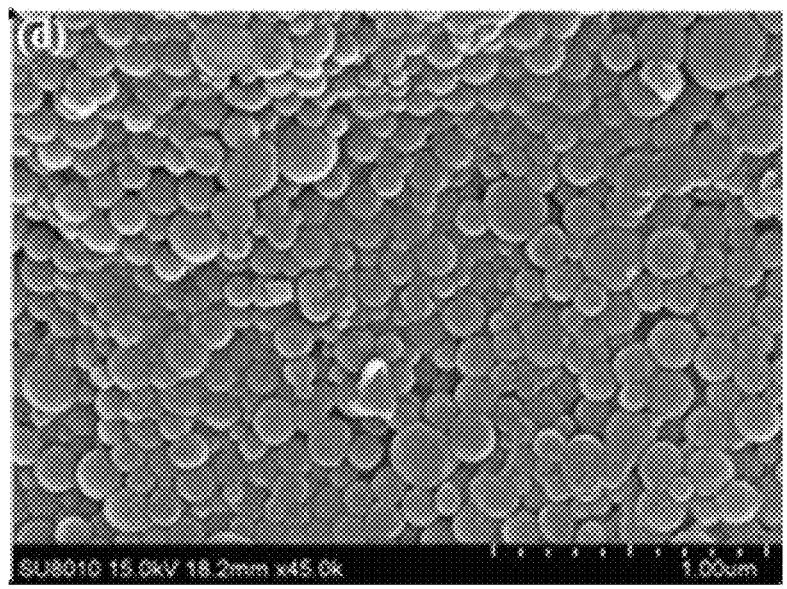

As shown in FIG. 1, equipment for continuously preparing graphene powder directly dispersed in an organic system is provided herein, which includes a pre-emulsification kettle 1, an emulsion-polymerization kettle 2, and a spray dryer 3 sequentially connected in series through pipelines.

The pre-emulsification kettle 1 is equipped with a first mechanical stirring device 101 and an ultrasonic probe 102, and the bottom of the pre-emulsification kettle 1 is provided with a first control valve 103. The emulsion-polymerization kettle 2 is equipped with a second mechanical stirring device 201 and a heating device 202, and the bottom of the emulsion-polymerization kettle 2 is provided with a second control valve 203. And a feeding peristaltic pump 301 is arranged in series on a pipeline between the emulsion-polymerization kettle 2 and the spray dryer 3.

The pre-emulsification kettle 1 is configured for a pre-emulsification of raw materials.

The ultrasonic probe 102 is configured to emulsify the oil-soluble monomer into micro-nano droplets and promote adsorption of the micro-nano droplets on a surface of a graphene oxide sheet.

The first mechanical stirring device 101 is configured to assist emulsification of the oil-soluble monomer in allowing the micro-nano droplets of the oil-soluble monomer and graphene oxide sheets to be uniformly dispersed in the water phase.

The emulsion-polymerization kettle 2 is configured for an emulsion polymerization reaction of the oil-soluble monomer.

The heating device 202 is configured to provide a required temperature for the emulsion polymerization reaction.

The second mechanical stirring device 201 is configured for uniform mixing of an emulsion polymerization reaction system;

The feeding peristaltic pump 301 is configured to pump the reaction mixture after emulsion polymerization in the emulsion-polymerization kettle 2 into the spray dryer 3 at a constant speed.

The spray dryer 3 is configured to rapidly dry the reaction mixture into the graphene powder.

A method for continuously preparing graphene powder directly dispersed in an organic system is performed as follows.

(S1) A graphene oxide aqueous dispersion, an emulsifier and an oil-soluble monomer are added successively into the pre-emulsification kettle 1 and followed by adjusting the pH of the system to alkaline and dispersing at room temperature by using the first mechanical stirring device 101 and the ultrasonic probe 102 to obtain a pre-emulsified dispersion.

(S2) The first control valve 103 is opened, and the pre-emulsified dispersion is fed into the emulsion-polymerization kettle 2. Then the second mechanical stirring device 201 and the heating device 202 are turned on to heat the pre-emulsified dispersion to a first preset temperature under stirring. And an initiator is added to carry out an emulsion polymerization reaction.

(S3) The emulsion-polymerization kettle 2 is adjusted to a second preset temperature; a reducing agent is added to reduce graphene oxide, and then the heating device 202 is turned off.

(S4) The second control valve 203 is opened, and a reaction mixture after emulsion polymerization in the emulsion-polymerization kettle 2 is fed into the spray dryer 3 through the feeding peristaltic pump 301 and followed by drying at a third preset temperature to obtain the graphene powder.

In an embodiment, in step (S1), a mass ratio of an oil-soluble monomer to an emulsifier to graphene oxide is (10~100): (0.5~5): 1, and the dispersion process is performed for 0.1~1 h. Preferably, the mass ratio of the oil-soluble monomer to the emulsifier and the graphene oxide is (30~80): (1~4): 1, and the dispersion process is performed for 0.3~0.8 h. Specifically, the concentration of the added graphene oxide aqueous dispersion is 0.1~10 mg/mL, the pH of the pre-emulsification system is 8~14, and the mechanical stirring rate is 100~500 r/min. Preferably, the concentration of the graphene oxide aqueous solution is 1~8 mg/mL, the pH of the pre-emulsification system is 9~12, and the mechanical stirring rate is 200~400 r/min.

In an embodiment, in step (S1), the oil-soluble monomer is an olefinic monomer selected from the group consisting of styrene, ethylene, vinyl acetate, vinyl chloride, butadiene, isoprene, methyl acrylate and methyl methacrylate, but not limited to this.

In an embodiment, in step (S1), the emulsifier is selected from the group consisting of fatty acid salt, sulfate, sulfonate, quaternary ammonium salt, amino acid, dehydrated sorbitol fatty acid ester, polyoxyethylene dehydrated sorbitol fatty acid ester, alkylphenol polyether alcohol, polyvinyl alcohol, polyvinylpyrrolidone, polyoxyethylene fatty acid, and polyoxyethylene fatty acid ether, but not limited to this.

In an embodiment, in step (S2), the mass ratio of the initiator to the oil-soluble monomer is (0.001~0.05): 1, preferably (0.009~0.04): 1, and the emulsion polymerization is performed at 70~100° C. for 4~10 h, preferably at 75~95° C. for 6~9 h.

In an embodiment, in step (S2), the stirring rate is 100~500 r/min, preferably 200~400 r/min.

In an embodiment, in step (S2), the initiator is a water-soluble initiator or a redox composite initiation system; the water-soluble initiator is selected from the group consisting of potassium persulfate and ammonium persulfate; the oxidant in the redox composite initiation system is selected from the group consisting of hydrogen peroxide, persulfate and hydroperoxide, and the reducing agent in the redox composite initiation system is selected from the group consisting of sodium bisulfite, sodium sulfite, alcohol, amine and oxalic acid.

In an embodiment, in step (S3), a mass ratio of the reducing agent to the graphene oxide is (0.1~10): 1, and the reduction reaction is performed at 70~100° C. for 0.5~24 h. Preferably, the mass ratio of the reducing agent to the graphene oxide is (0.8~8): 1, and the reduction reaction is performed at 75~95° C. for 1~20 h.

In an embodiment, in step (S3), the reducing agent is selected from the group consisting of hydrazine and hydrazine derivative, amino acid, amine, a monohydric alcohol, polyhydric alcohol, monohydric phenol, polyhydric phenol, inorganic sulfide, organic sulfide, strong alkali, metal hydride, alkali metal, amphoteric metal, and low-valent metal ion, but not limited to it.

In an embodiment, in step (S4), an inlet air temperature of the spray dryer 3 is 60~200° C., and an outlet air temperature is 20~100° C. . Preferably, the inlet air temperature of the spray dryer 3 is 80~180° C., and the outlet air temperature is 30~90° C.

The technical solution of the present disclosure will be described in detail below with reference to the embodiment.

EXAMPLE

Provided herein was a method for continuously preparing graphene powder directly dispersed in an organic system, which was performed as follows.

4 kg of a graphene oxide aqueous dispersion, 20 g of sodium dodecyl sulfate, and 200 g of methyl methacrylate were added successively into the pre-emulsification kettle 1, and the reaction mixture was adjusted to pH 8. The first mechanical stirring device 101 and the ultrasonic probe 102 were turned on to disperse the reaction mixture at room temperature for 30 min, where a stirring rate of the first mechanical stirring device 101 was set to 200 r/min, and a power of the ultrasonic probe 102 was set to 200 W.

The first control valve 103 was opened, and the reaction mixture was fed into the emulsion-polymerization kettle 2.

The second mechanical stirring device 201 and the heating device 202 were turned on, where the stirring rate of the second mechanical stirring device 201 was set to 200 r/min. After heated to 70° C., the reaction mixture was added with 2 g of potassium persulfate to undergo the emulsion polymerization reaction, which lasted for 4 h.

The emulsion-polymerization kettle 2 was adjusted to 90° C., and 40 g of hydrazine hydrate was added to reduce the graphene oxide. 2 h later, the heating device 202 was turned off.

The second control valve 203 was opened, and the reaction mixture was fed into the spray dryer 3 through the feeding peristaltic pump 301 and dried to obtain the graphene powder, where an inlet air temperature of the spray dryer 3 was 65° C., and an outlet air temperature was 25° C.

Figure 3:
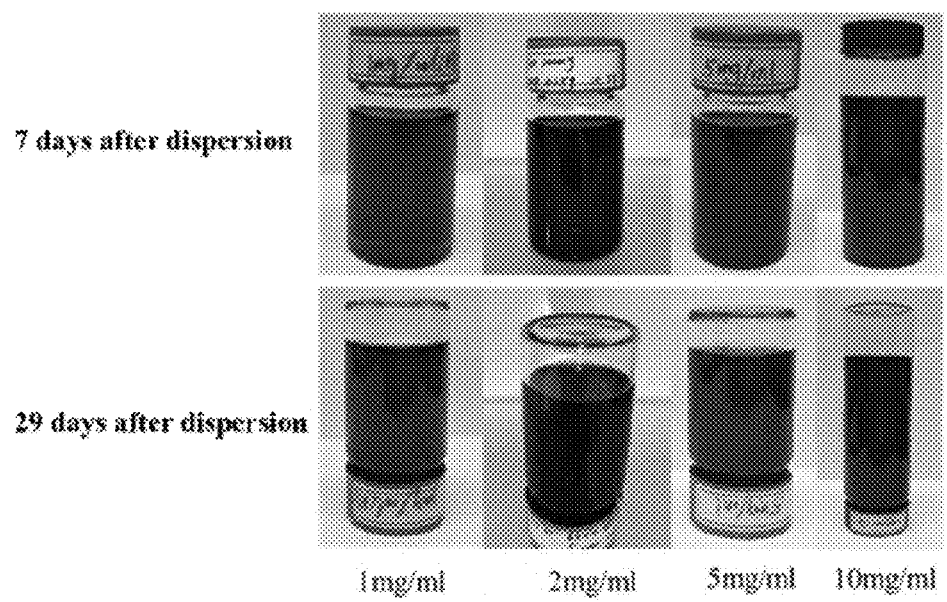
FIG. 3 shows a series of dispersions of graphene powder in acetone (the concentrations of graphene powder are 1 mg/mL, 2 mg/mL, 5 mg/mL and 10 mg/mL, respectively) after standing for 7 and 29 days, respectively.

As shown in the SEM images in FIGS. 2a-2d, the reduced graphene oxide sheets were tightly wrapped by polymethyl methacrylate (PMMA) nanospheres with a diameter of about 100 nm, indicating that the graphene powder had been successfully prepared. It was demonstrated by FIG. 3 that the graphene powder prepared herein had good dispersion stability in acetone.

Described above are merely preferred embodiments of the disclosure, which are not intended to limit the disclosure. It should be understood that any modifications and replacements made by those skilled in the art without departing from the spirit of the disclosure should fall within the scope of the disclosure defined by the appended claims.

What is claimed is:

1. A method for continuously preparing graphene powder directly dispersed in an organic system, equipment used in the method comprising a pre-emulsification kettle, an emulsion-polymerization kettle and a spray dryer connected sequentially in series through pipelines; the equipment further comprising a feeding peristaltic pump arranged in series on a pipeline between the emulsion-polymerization kettle and the spray dryer; the pre-emulsification kettle being equipped with a first mechanical stirring device and an ultrasonic probe; a bottom of the pre-emulsification kettle being provided with a first control valve; the emulsion-polymerization kettle being equipped with a second mechanical stirring device and a heating device; a bottom of the emulsion-polymerization kettle being provided with a second control valve; and the method comprising:

(S1) adding successively a graphene oxide aqueous dispersion, an emulsifier and an oil-soluble monomer into the pre-emulsification kettle, followed by adjusting pH to alkaline and dispersing at room temperature by using the first mechanical stirring device and the ultrasonic probe to obtain a pre-emulsified dispersion; wherein the oil-soluble monomer is an olefinic monomer;

(S2) opening the first control valve and feeding the pre-emulsified dispersion into the emulsion-polymerization kettle; turning on the second mechanical stirring device and the heating device to heat the pre-emulsified dispersion to a first preset temperature under stirring; and adding an initiator to carry out an emulsion polymerization reaction;

(S3) adjusting the emulsion-polymerization kettle to a second preset temperature; adding a reducing agent to reduce graphene oxide; and turning off the heating device; and (S4) opening the second control valve; and feeding a reaction mixture in the emulsion-polymerization kettle into the spray dryer through the feeding peristaltic pump, followed by drying at a third preset temperature to obtain the graphene powder;

wherein the pre-emulsification kettle is configured for pre-emulsification of raw materials;
the ultrasonic probe is configured to emulsify the oil-soluble monomer into micro-nano droplets and promote adsorption of the micro-nano droplets on a surface of a graphene oxide sheet, and an ultrasonic power of the ultrasonic probe is 200 W;
the first mechanical stirring device is configured to assist emulsification of the oil-soluble monomer to allow the micro-nano droplets of the oil-soluble monomer and graphene oxide sheets to be uniformly dispersed in water; and a stirring speed of the first mechanical stirring device is 200~400 r/min;
the emulsion-polymerization kettle is configured for the emulsion polymerization reaction of the oil-soluble monomer;
the heating device is configured to provide a required temperature for the emulsion polymerization reaction;
the second mechanical stirring device is configured for uniform mixing of an emulsion polymerization reaction system;
the feeding peristaltic pump is configured to pump the reaction mixture after the emulsion polymerization reaction in the emulsion-polymerization kettle into the spray dryer at a constant speed; and
the spray dryer is configured to dry the reaction mixture into the graphene powder.

2. The method of claim 1, wherein in step (S1), a mass ratio of the oil-soluble monomer to the emulsifier to graphene oxide is (10~100): (0.5~5): 1, and the dispersion is performed for 0.1~1 h.

3. The method of claim 1, wherein in step (S1), the olefinic monomer is selected from the group consisting of styrene, ethylene, vinyl acetate, vinyl chloride, butadiene, isoprene, methyl acrylate, and methyl methacrylate.

4. The method of claim 1, wherein in step (S1), the emulsifier is selected from the group consisting of fatty acid salt, sulfate, sulfonate, quaternary ammonium salt, amino acid, dehydrated sorbitol fatty acid ester, polyoxyethylene dehydrated sorbitol fatty acid ester, alkylphenol polyether alcohol, polyvinyl alcohol, polyvinylpyrrolidone, polyoxyethylene fatty acid, and polyoxyethylene fatty acid ether.

5. The method of claim 1, wherein in step (S2), a mass ratio of the initiator to the oil-soluble monomer is (0.001~0.05): 1, and the emulsion polymerization reaction is performed at 70~100° C. for 4~10 h.

6. The method of claim 1, wherein in step (S2), the initiator is a water-soluble initiator or a redox composite initiation system; the water-soluble initiator is selected from the group consisting of potassium persulfate and ammonium persulfate; an oxidant in the redox composite initiation system is selected from the group consisting of hydrogen peroxide, persulfate and hydroperoxide, and a reducing agent in the redox composite initiation system is selected from the group consisting of sodium bisulfite, sodium sulfite, alcohol, amine and oxalic acid.

7. The method of claim 1, wherein in step (S3), a mass ratio of the reducing agent to the graphene oxide is (0.1~10): 1; and the reduction reaction is performed at 70~100° C. for 0.5~24 h.

8. The method of claim 1, wherein in step (S3), the reducing agent is selected from the group consisting of hydrazine and hydrazine derivative, amino acid, amine, monohydric alcohol, polyhydric alcohol, monohydric phenol, polyhydric phenol, inorganic sulfide, organic sulfide, strong alkali, metal hydride, alkali metal, and amphoteric metal.

9. The method of claim 1, wherein in step (S4), an inlet air temperature of the spray dryer is 60~200° C., and an outlet air temperature of the spray dryer is 20~100° C. .

* * * * *